United States Patent

[11] 3,542,133

[72] Inventor Ary Van Der Lely
   10 Weverskade, Maasland, Netherlands
[21] Appl. No. 706,006
[22] Filed Feb. 16, 1968
[45] Patented Nov. 24, 1970
[32] Priority Feb. 23, 1967
[33] Netherlands
[31] No. 6,702,737

[54] CULTIVATING IMPLEMENTS
   11 Claims, 5 Drawing Figs.
[52] U.S. Cl. .................................................. 172/32, 172/112
[51] Int. Cl. ................................................ A01b 33/16
[50] Field of Search ........................................... 172/81, 112, 123, 511, 32

[56] References Cited
   UNITED STATES PATENTS
| 980,484 | 1/1911 | Bradley | 172/112X |
| 1,662,088 | 3/1928 | Von Raussendorff | 172/112X |
| 1,676,646 | 7/1928 | Funk | 172/123X |
| 2,214,702 | 9/1940 | Seaman | 172/112X |
| 2,312,164 | 2/1943 | Holzbock | 172/112 |
| 2,473,770 | 6/1949 | Seaman | 172/32X |
| 3,409,088 | 11/1968 | Lindbeck et al. | 172/112X |

Primary Examiner—Robert E. Bagwill
Assistant Examiner—Alan E. Kopecki
Attorney—Mason, Mason & Albright ABSTRACT: A cultivator with a rotor having soil-working members with an overhead hood and a screening baffle. The screening baffle is deflectable, at least in part, relative to the rotor to allow passage of debris too large to pass through the baffle and thus stoppage and damage are mitigated.

INVENTOR
ARY VAN DER LELY

CULTIVATING IMPLEMENTS

This invention relates to cultivating implements of the kind comprising a frame, a soil-working rotor rotatably mounted in the frame and a screening baffle which partially surrounds soil-working members carried by said rotor.

An object of the invention is a reduction in the tendency to jamming and damage caused by the excavation of large stones and the like during the use of such cultivators.

According to the invention, there is provided a cultivating implement of the kind set forth, wherein a portion of the screening baffle is arranged so as to be capable of deflecting with respect to the frame in a direction such that the distance between the whole of said portion and a figure described by the paths of movement of the free ends of the soil-working members is increased.

For a better understanding of the invention, and to show how the same may be carried into effect, reference will now be made, by way of example, to the accompanying drawings, in which.

Figure 2:
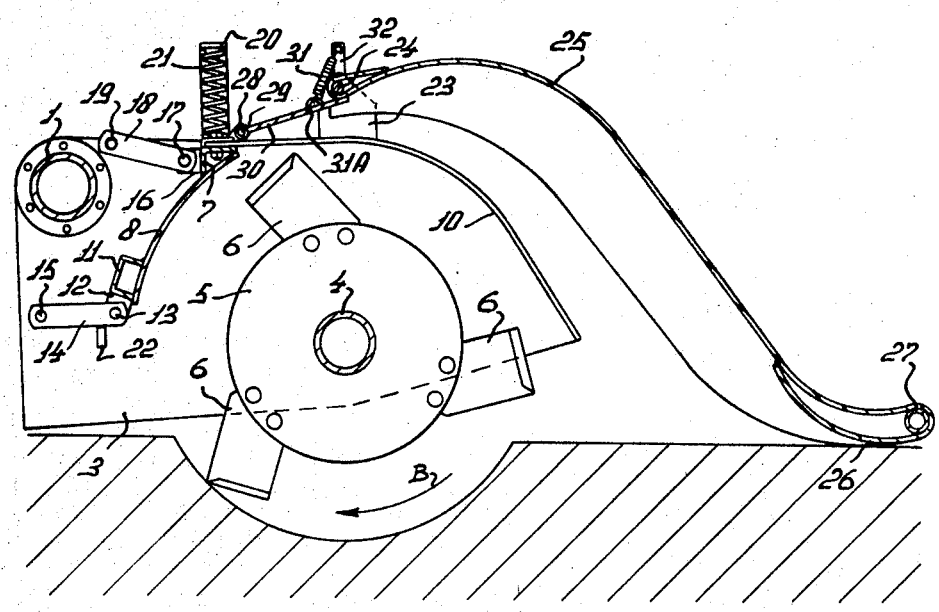
FIG. 2 is a section taken on the line II–II of FIG. 1.
Figure 3:
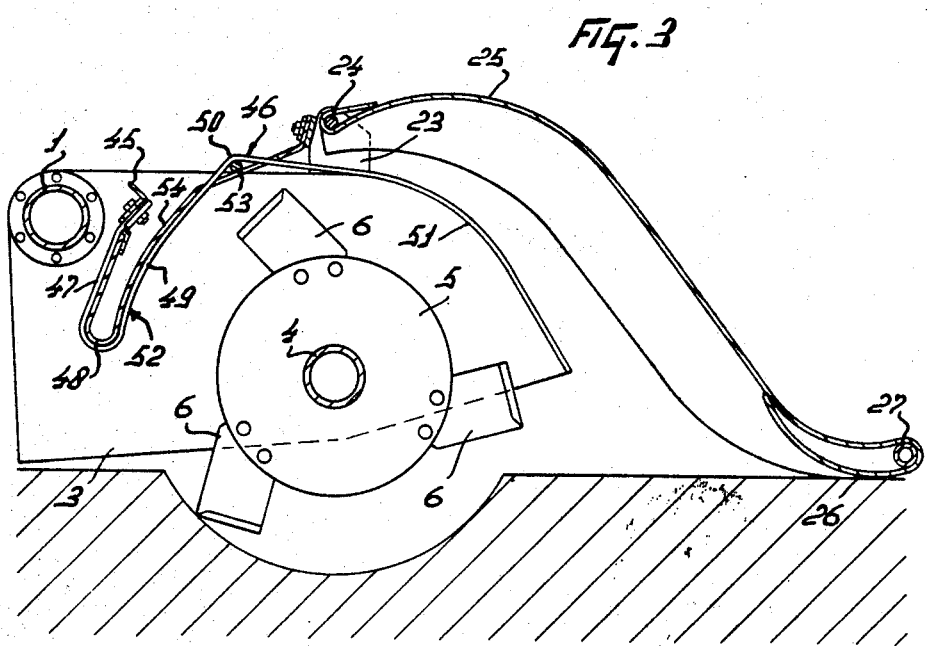
Figure 4:
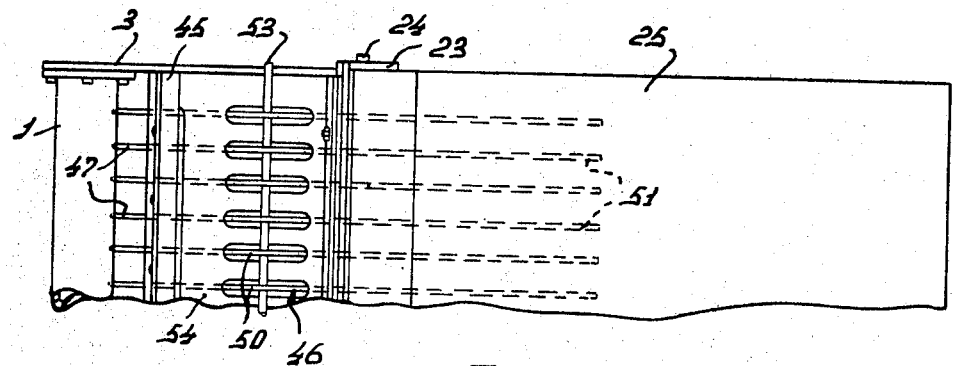

FIG. 3 corresponds to FIG. 2 but illustrates the construction of an alternative form of cultivator in accordance with the invention;

FIG. 4 is a partial plan view of the cultivator of FIG. 3; and

Figure 5:
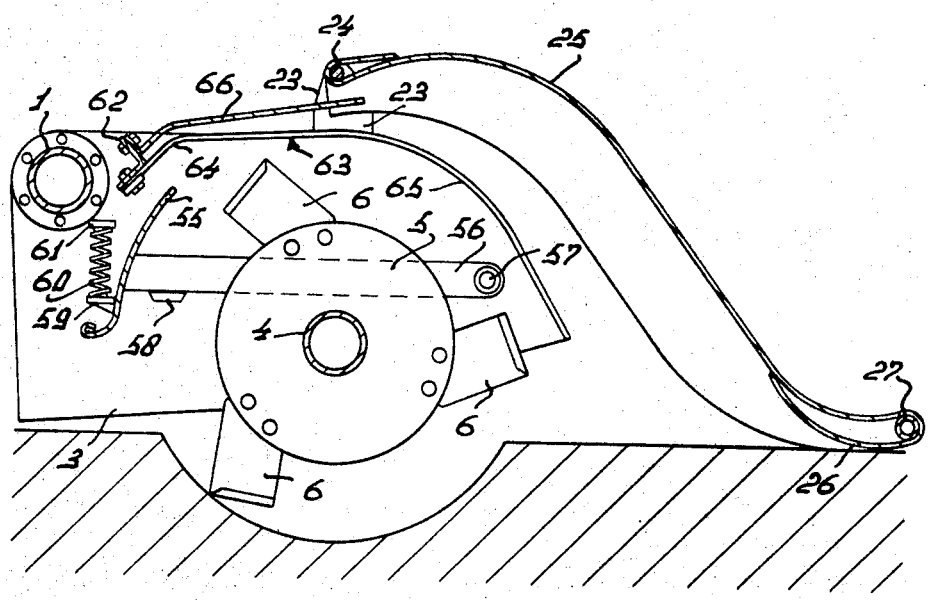

FIG. 5 corresponds to FIGS. 2 and 3 but illustrates the construction of a third form of cultivator in accordance with the invention.

Figure 1:
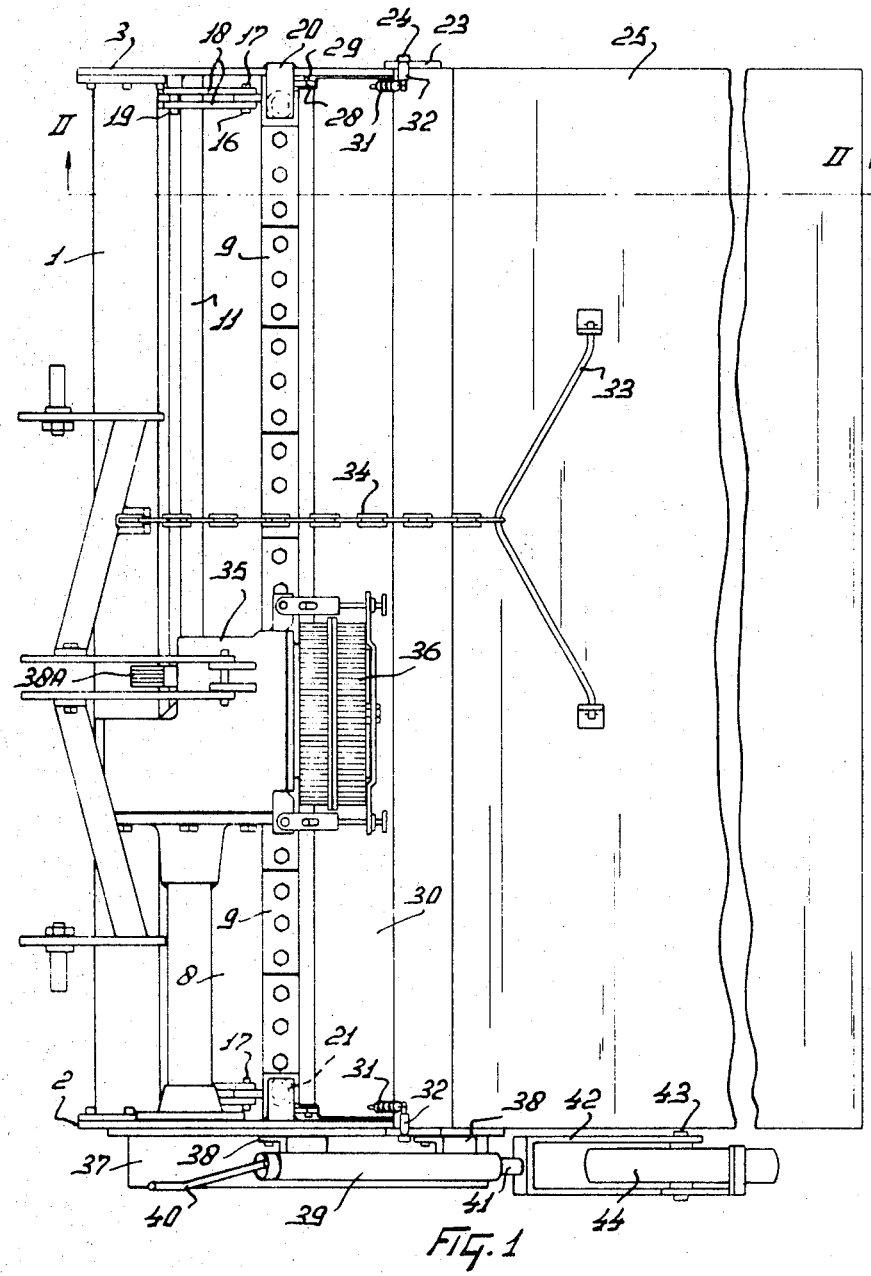
FIG. 1 is a plan view of a cultivating implement or cultivator in accordance with the invention.

Referring to FIGS. 1 and 2 of the drawings, the cultivating implement or cultivator which is illustrated has a frame which includes a main frame beam 1 that extends substantially horizontally perpendicular to the intended direction of operative travel of the cultivator. Cheek plates 2 and 3 are secured to the opposite ends of the main frame beam 1 so as to extend substantially perpendicular to the longitudinal axis of said beam and so as to lie principally to the rear of the beam relative to the intended direction of operative travel of the cultivator. A soil-working rotor has a central shaft 4 which is rotatably journaled in bearings carried by the cheek plates 2 and 3 towards the lowermost edges thereof, said shaft 4 extending substantially parallel to the main frame beam 1. A plurality of circular discs 5 are secured to the shaft 4 at regular intervals therealong, each disc 5 carrying soil-working members in the form of three blades 6 that are spaced apart from one another at 120° intervals around the circumference of the corresponding disc 5. The blades 6 are arranged on the discs 5 in such a way that, viewed lengthwise of the shaft 4, they are disposed in three regularly spaced rows that are wound helically around the longitudinal axis of the shaft 4.

A bar 7 of L-shaped cross section lies between the cheek plates 2 and 3 adjacent their upper edges in such a way that it extends substantially parallel to the main frame beam 1 without a rigid connection to said cheek plates. The uppermost edge of a portion 8 of a hood-shaped screening baffle is secured to the bar 7, said portion 8 extending downwardly and forwardly from the bar 7 and being curved in such a way that its center of curvature substantially coincides with the longitudinal axis of the shaft 4. However, the portion 8 subtends an angle of appreciably less than 90° at the longitudinal axis of the shaft 4. A plurality of spring steel rods 10 that are equidistantly spaced apart from one another have their leading ends fastened to the uppermost surface of the bar 7 by a plurality of clamps 9 that are provided with bolts. The spring steel rods 10 project rearwardly from the bar 7 and include curved regions whose centers of curvature substantially coincide with the longitudinal axis of the shaft 4. The rods 10 together form a yieldable sieve or gridlike portion of the hood-shaped screening baffle.

The lowermost and leading edge region of the portion 8 of the hood-shaped screening baffle is fastened to a beam 11 that extends parallel to the frame beam 1 between the cheek plates 2 and 3. Lugs 12 project downwardly from the beam 11 at locations adjacent the two cheek plates and pairs of parallel and closely spaced apart arms 14 are pivotally connected to opposite sides of the lugs 12 with the aid of substantially horizontal pins 13. The arms 14 project substantially horizontally forwards from the pins 13 and their leading ends are pivotally connected to the cheek plates 2 and 3 respectively with the aid of substantially horizontal pins 15. Lugs 16 project forwardly from the bar 7 at locations adjacent the cheek plates 2 and 3 respectively and pairs of arms 18 are pivotally connected to opposite sides of the lugs 16 with the aid of substantially horizontal pins 17 in a similar manner to the connection of the pairs of arms 14 to the lugs 12. The arms 18 project forwardly and upwardly from the lugs 16 and their leading ends are pivotally connected to the cheek plates 2 and 3 respectively by substantially horizontal pivot pins 19. It will be readily apparent from FIG. 2 of the drawings that the longitudinal axes of the arms 14 will intersect the longitudinal axes of the arms 18 at points which are disposed well to the rear of the shaft 4, that is to say, at the opposite side of said shaft from the side at which the arms 14 and 18 are actually disposed.

Brackets 20 of inverted L-shaped configuration have their vertical limbs secured to the cheek plates 2 and 3 respectively at opposite ends of the bar 7 and helical compression springs 21 extend vertically between dowels carried by the horizontal limbs of the brackets 20 and dowels or the like that project upwardly from the bar 7. Stops 22 project towards one another from the cheek plates 2 and 3 at the locations at which they are beneath, and in the path of movement of, the arms 14.

The springs 21 normally push the arms 14 downwardly about the pivot pins 15, through the intermediary of the portion 8, into contact with the stops 22. The cheek plates 2 and 3 also carry large upwardly projecting lugs 23 the uppermost ends of which carry a substantially horizontal shaft 24 that extends parallel to the main frame beam 1. The leading end of a hood 25 is engaged around the shaft 24 and it will be apparent from the drawings that the hood 25 covers most of the yieldable sieve or gridlike portion (afforded by the spring steel rods 10) of the hood-shaped screening baffle. The hood 25 is shaped in such a way that a tail-portion 26 thereof bears against, and slides over, the ground surface during use of the cultivator. The tail portion 26 of the hood 25 is formed by bending part of said hood around a tubular stiffening beam 27 which extends substantially parallel to the shaft 24.

The bar 7 is provided with small upwardly and rearwardly projecting lugs 28 at locations adjacent its opposite ends and a plate 30 is pivotally connected to said lugs with the aid of horizontal pins 29. The plate 30 affords a cover extending between the rear of the bar 7 and the front of the hood 25, the rear edge of the plate 30 bearing against said hood 25 immediately beneath the shaft 24. Helical tension springs 31 interconnect eyes 31A mounted on the upper surface of the plate 30 and anchorages 32 carried by the aforementioned large lugs 23. The springs 31 thus tend to turn the plate 30 about the pins 29 in an anticlockwise direction as seen in FIG. 2 of the drawings so that the rearmost edge of the plate 30 normally remains in contact with the hood 25. A large bracket 33 is pivotally connected to the upper surface of the hood 25 and a chain 34 interconnects the bracket 33 and an anchorage mounted on part of a coupling member arranged for connection to the three-point lifting device or hitch of an agricultural tractor or other vehicle. The construction of the coupling member does not form the subject of the present invention and, accordingly, no further description thereof will be given. It will be apparent that the chain 34 can be lengthened or shortened to retain the hood 25 in corresponding angular settings about the shaft 24.

A gear box 35 is connected to the main frame beam 1 adjacent the middle of the latter and has a forwardly projecting rotary input shaft 38A intended to be placed in driven connection with the power takeoff shaft of a tractor or other vehicle with the aid of an intermediate transmission shaft having universal joints at its opposite ends. A gear casing 36 is releasably secured to the rear of the gear box 35 in such a way that it can be operatively connected to said gear box in several different ways each one of which will give a different transmission ratio between the shaft 38A and an output shaft of the gear box 35. The output shaft of the gear box 35 extends in a casing between said box and a second casing 37 that is connected to the cheek plate 2, the first-mentioned casing being parallel to the main frame beam 1. Transmission members that are contained in the second casing 37 are arranged to drive the shaft 4 from one end thereof.

Relatively spaced brackets 38 support a tube 39 at the rear of the casing 37 with respect to the intended direction of operative travel of the cultivator and a screw-threaded spindle 40 having a cranked operating handle is operatively received in the tube 39 in a manner which is not shown in detail in the drawings. However, the arrangement is such that rotation of the spindle 40 in one direction or the other causes a tube 41 to be drawn further into, or pushed further out from the lowermost end of the tube 39. The free projecting end of the tube 41 carries a bracket 42 the limbs of which support a horizontal axle 43 about which a ground wheel 44 is rotatable between said limbs. One of the limbs of the forked bracket 42 carries a mud-scraper arranged to cooperate with the ground wheel 44. The level of the axle 43 relative to that of the remainder of the cultivator, which level can be adjusted by appropriate manipulation of the spindle 40, is a principal factor in determining the depth to which the blades 6 will penetrate into the ground surface during operation of the cultivator.

In the embodiment illustrated in FIGS. 3 and 4 of the drawings, a bar 45 of L-shaped cross section interconnects the cheek plates 2 and 3 immediately to the rear of the main frame beam 1. A screening baffle which is generally indicated by the reference 52 is of yieldable formation and includes a plurality of regularly spaced spring steel rods 46 having ends that are clamped to the bar 45. Each rod 46 has a portion 47 which projects downwardly and forwardly from the bar 45 to merge into an approximately 180° bend 48 which merges, in turn, into a curved portion 49 whose center of curvature is approximately coincident with the longitudinal axis of the shaft 4. The uppermost end of the portion 49 is integrally connected by an angular junction 50 to a portion 51 of substantially the same configuration as the whole of one of the previously described rods 10. The portions 51 together again afford a yieldable sieve or gridlike portion of the screening baffle 52. A flexible cover 54 which is preferably formed from rubber, synthetic rubber or some other similar material bears against the portions 47, 48 and 49 of the rods 46 at the concave sides of the bends 48 and is formed with a plurality of slots (visible in FIG. 4 of the drawings) through which regions of the rods 46 that include the angular junctions 50 project so that they lie above the cover 54. A rod 53 that extends substantially parallel to the main frame beam 1 is entered beneath all of the angular junctions 50 as to lie between those junctions and the upper surface of the cover 54. The opposite ends of the rod 53 bear against the uppermost edges of the cheek plates 2 and 3 respectively. One edge of the cover 54 is clamped to the bar 45 and the opposite and rearmost edge thereof is clamped to a strip interconnecting the large lugs 23 immediately in front of the leading edge of the hood 25.

The cultivator which is illustrated in FIG. 5 of the drawings has a portion 55 of a screening baffle arranged movably between the cheek plates 2 and 3 at the leading ends of arms 56 whose rearmost ends are pivotally connected to said cheek plates 2 and 3 by horizontal pins 57. Most of the portion 55 is curved in such a way that its center of curvature substantially coincides with the longitudinal axis of the shaft 4. It will be noted that the pins 57 are disposed to the rear of the shaft 4 whereas the portion 55 is disposed well in front of said shaft. The portion 55 subtends an angle of appreciably less than 90° at the longitudinal axis of the shaft 4. The arms 56 bear downwardly against stops 58 carried by the cheek plates 2 and 3 respectively. Dowel-carrying supports 59 project forwardly from the portion 55 of the screening baffle and helical compression springs 60 bear between said supports 59 and dowel-carrying stops 61 that project from the cheek plates 2 and 3 respectively. Thus, the springs 60 tend to turn the arms 56 downwardly about the pivot pins 57 into engagement with the stops 58.

A bar 62 of L-shaped cross section interconnects the cheek plates 2 and 3 immediately to the rear of the main frame beam 1 and the leading ends of a plurality of spring steel rods 63 are clamped to lower limb of the bar 62. The spring steel rods 63 afford yieldable portion of the screening baffle. Each rod 63 includes a straight portion 64 that projects upwardly and rearwardly away from the lower limb of the bar 62. the portion 64 integrally merging at its rear end into a portion 65 which has approximately the same shape as the whole of one of the spring steel rods 10. The portions 65 together afford a sieve or gridlike portion of the screening baffle. A plate 66 has its leading edge bolted to the upper limb of the bar 62, a said plate closely overlying the portions 64 of the rods 63 and t leading regions of the portions 65 of those rods. The rearmost edge of the plate 66 is located just behind the leading edge of the hood 25.

During use of the implement described with reference to FIGS. 1 and 2 of the drawings, the coupling member is connected to the three-point lifting device or hitch of an agricultural tractor or other vehicle and the rotary input shaft 38A is driven by the power takeoff shaft of the same tractor or other vehicle to rotate the soil-working rotor in the direction indicated by the arrow B in FIG. 2 of the drawings, that is to say, in a direction in which the blades 6 move forwardly through the soil relative to the direction of travel of the cultivator. The speed rotation of the shaft 4 will depend upon the speed of rotation of the power takeoff shaft and upon the chosen position of the gear casing 36. The blades 6 throw the excavated earth upwardly in front of, and rearwardly over, the shaft 4 and solid constituents of the earth (i.e. stones and the like) are guided rearwardly along the rods 10 without being able to pass therebetween. Most of the loose well-broken soil, on the other hand, passes between the rods 10 and comes into contact with the unbroken hood 25. Thus, stones and the like fall to the bottom of the soil cavity which is excavated by the blades 6 to be subsequently buried by the soil which is directed thereupon by the hood 25, this soil being lastly smoothed or flattened by the tail-portion 26 of the hood 25.

If the blades 6 should raise a large stone during their movement in the direction B through the soil, the portion 8 of the baffle can allow passage of this stone by turning upwardly in an approximately vertical direction as a result of the movements of the arms 14 and 18 about the pins 15 and 19 respectively. The pins 13, 15, 17 and 19 are located at the four corners of a rectangle and the movement which has just been mentioned is thus such that the portion 8 of the baffle is temporarily displaced to a position in which it is spaced further from the cylindrical figure described by the tips of all the blades 6 during their paths of movement than when the arms 14 are in contact with the stops 22.

In the use of the cultivator described with reference to FIGS. 3 and 4 of the drawings, the resilient support of the portions 49 (which are themselves resilient) of the rods 46 is such that said portions 49 and the associated region of the flexible cover 54 move upwardly away from the aforementioned cylindrical figure containing the paths of movement of the tips of all the blades 6 at a time when said blades 6 lift a large stone or the like upwardly into contact with said portions 49. The tendency for the screening baffle 52 to be damaged by large stones and the like is thus greatly reduced.

In the use of the cultivator described with reference to FIG. 5 of the drawings, the portion 55 of the baffle can move upwardly against the opposition of the spring 60, by turning about the pivot pins 57, when the blades 6 bring a large stone or the like into contact therewith so that the distance between said portion 55 and the cylindrical figure described by the paths of movement of the tips of all of the blades 6 increases. The yieldable portion of the baffle which is afforded by the spring steel rods 63 is not displaced with the portion 55 as occurs with the equivalent parts in the preceding embodiments but the resilient formation of the rods 63 is sufficient to prevent large stones and the like from permanently deforming them.

All of the cultivators which have been described are formed in such a way that the danger of jamming of large stones and the like between the blades 6 and the partially surrounding screening baffle is considerably reduced. Unnecessary stoppages during use of the cultivator and avoidable damage is thus also greatly reduced.

I claim:

1. A cultivating implement having a frame and a rotor mounted on said frame, said rotor having soil-working members rotatably mounted for movement through the soil in the direction of travel and transmission means for rotating said rotor, a screening baffle supported by said frame to extend above said rotor, said baffle having at least two portions adjacent to one another to comprise a forward portion and a rear portion relative to the direction of travel, said forward portion being secured to said frame for vertical movement relative to said frame by means of at least two pivotal link connections located one above the other, and resilient means connecting said frame with said baffle to bias the latter towards said rotor, a hood being pivotally mounted on said implement to extend above said baffle whereby said baffle and said hood are movable outwardly relative to said rotor so that relatively large objects can be thrown upwardly and over said rotor during operation.

2. An implement as claimed in claim 1, wherein said forward portion of said baffle is pivotally connected to said frame adjacent its uppermost and lowermost parts on each side of said implement by links, said links having pivot connections at both ends and said pivot connections being arranged at the four corners of a rectangle.

3. An implement as claimed in claim 2, wherein the longitudinal axes of the upper links intersect those of the lower links at a point located at the opposite side of the axis of rotation of said rotor from the side at which said links are located.

4. An implement as claimed in claim 3, wherein each lower link extends substantially horizontally when said forward portion is in normal and undeflected position.

5. An implement as claimed in claim 1, wherein the upper and lower links form a pair of links adjacent each lateral side of said forward portion of the baffle.

6. An implement as claimed in claim 1, wherein compression springs are positioned to bear on the upper surface of said forward portion of the baffle.

7. An implement as claimed in claim 6, wherein said compression springs are of helical configuration with their axes being substantially vertically disposed.

8. An implement as claimed in claim 1, wherein said rear portion of the baffle is also vertically deflectable with respect to said frame.

9. An implement as claimed in claim 8, wherein said two portions of the baffle as are fastened to one another.

10. An implement as claimed in claim 1, wherein said baffle is inherently flexible.

11. A cultivating implement having a frame and a rotor mounted on said frame, said rotor having soil-working members rotatably mounted for movement through the soil in the direction of travel and transmission means for rotating said rotor, a screening baffle supported on said frame to extend above and over said rotor, said baffle having at least two adjacent portions positioned one in front of the other to comprise a forward portion and a rear portion relative to the direction of travel, said baffle being resiliently secured to said frame by means of at least two vertically spaced apart connecting means, each of said connecting means including flexible means permitting vertical and outward movement of said baffle relative to said frame, at least one of said connecting means including a pivot connecting said forward portion to said flexible means, an outer hood being pivotally mounted on said implement to extend above said baffle and to pivot about connection means located above and adjacent the rear of said baffle whereby said baffle and said hood are outwardly movable with respect to said rotor so that relatively large objects can be thrown upwardly and over said rotor during operation.